(12) United States Patent
Gümmer

(10) Patent No.: US 7,293,964 B2
(45) Date of Patent: Nov. 13, 2007

(54) REPAIR METHOD FOR A BLADE OF A TURBOMACHINE

(75) Inventor: Volker Gümmer, Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 606 days.

(21) Appl. No.: 10/933,256

(22) Filed: Sep. 3, 2004

(65) Prior Publication Data

US 2005/0084368 A1 Apr. 21, 2005

(30) Foreign Application Priority Data

Sep. 4, 2003 (DE) ................................ 103 40 827

(51) Int. Cl.
*F01D 5/14* (2006.01)
*B23P 6/00* (2006.01)
(52) U.S. Cl. .................................. 416/223 A; 29/889.1
(58) Field of Classification Search ............... 29/889.1; 416/224, 223 A
See application file for complete search history.

(56) References Cited

U.S. PATENT DOCUMENTS 5,197,191 A * 3/1993 Dunkman et al. ......... 29/889.1

6,438,838 B1 8/2002 Meier

FOREIGN PATENT DOCUMENTS

| DE | 19712868 | 3/1997 |
|---|---|---|
| DE | 19831736 | 7/1998 |

\* cited by examiner

Primary Examiner—Richard A Edgar
(74) Attorney, Agent, or Firm—Timothy J. Klima

(57) ABSTRACT

A turbomachine blade is repaired by making a leading edge cutback between two points (A) and (E) where point (A) lies within a range of relative blade height (h/H) of $0 \leq (h/H)_{point\ A} < 0.85$, and point (E) lies within a range of $0.95 < (h/H)_{point\ E} \leq 1.0$, with (h) being a blade height coordinate which originates at an end of the blade closer to starting point (A), and (H) being the blade height. A cutback trace is defined by $(s/S_{AE})$ and $(c/C_m)$, with (c) being a local cutback length in meridional flow direction, ($C_m$) being a meridional chord length, (s) being a local cutback length in radial direction, and ($S_{AE}$) being a radial cutback length, where (c) gradually increases from point (A) to its maximum at $0.60 < s/S_{AE} < 0.95$, with $(c/C_m)$ there being $\leq 0.25$, and then decreasing to $\leq 0.05$.

4 Claims, 4 Drawing Sheets

REPAIR METHOD FOR A BLADE OF A TURBOMACHINE

This application claims priority to German Patent Application DE10340827.4 filed Sep. 4, 2004, the entirety of which is incorporated by reference herein.

BACKGROUND OF THE INVENTION

This invention relates to a repair method for a blade of a turbomachine. More particularly, this invention relates to a repair method in which at least a partial area of a leading edge of the blade is removed.

Turbomachines according to the present invention are, for example, fans, compressors, pumps and blowers of the axial, semi-axial and radial type which can be operated with gaseous or liquid working media. The turbomachine according to the present invention can comprise one or several stages, each with one rotor and one stator, in isolated cases, the stage may also consist of a rotor only. The rotor features a number of blades which are connected to the rotating shaft of the turbomachine and impart energy to the working medium. In accordance with the present invention, the rotor can be shrouded or shroudless at the outer blade end.

The stator may consist of a number of stationary blades with fixed or free blade ends on the casing side as well as on the hub side. The rotor drum and the blading are usually enclosed by a casing; however, in accordance with the present invention, a casing is dispensable, for example in the case of ship or aircraft propellers.

The turbomachine may also be provided with a stator upstream of the first rotor, a so-called inlet guide vane assembly. Instead of being fixed, at least one stator or guide vane assembly can be rotatable to change the angle of incidence. Such variation can, for example, be accomplished by a spindle accessible from outside of the annulus. Alternatively, multi-stage versions of the turbomachine in accordance with the present invention may have two contra-rotating shafts, with the rotor blade rows rotating in opposite directions from stage to stage. Here, stators do not exist between subsequent rotors. Furthermore, the turbomachine according to the present invention may alternatively have a bypass configuration, in which a single-flow annulus divides into two concentric annuli behind a certain blade row, with the concentric annuli again comprising at least one further blade row.

The efficiency and operating stability of turbomachines, such as fans, compressors, pumps or blowers, are subject to considerable operational degradation which necessitates modification or rework of components of the turbomachine which have seen extended service use. As a further aspect, component wear leads to increased vibrational load, as a result of which the originally expected life of blades and disks is not achievable.

Therefore, in adverse cases, the stability margin of the turbomachine provided in the original design of the blading may partly or fully be lost or the actual life of blades and/or disks may be shortened. The reason for this is, for example, a growth of the radial running gaps, in particular at the blade tips of rotors, which results in an intensification of the detrimental flow across the radial gaps from the pressure to the suction side of each blade.

Basically, subsequent improvement of the flow field can be achieved by applying specific measures to either the casing or the blading. One possibility is a special structuring of the casing in the running path of the blades by so-called 'casing treatments'.

As regards the repair of blades, it is known from the state of the art to grind out the damaged areas, in particular to avoid notch effects. However, these standard measures frequently lead to a significant decrease in the performance of the turbomachine. In addition, blades which shall be repairable by such methods must be oversized considerably to provide sufficient repair stock. A repair method is known from Specification DE 197 12 868 C1, for example.

BRIEF SUMMARY OF THE INVENTION

It is a broad aspect of the present invention to provide a repair method of the type specified above which, while being simply designed, easily and cost-effectively practicable as well as safe, provides for a high degree of efficiency of the turbomachine.

It is a particular object of the present invention to provide a solution to the above problems by a combination of the features described herein. Further advantageous embodiments of the present invention will be apparent from the description below.

Accordingly, the present invention provides for a leading edge cutback on at least one of the existing blades of the turbomachine which improves the operating performance and/or life of the turbomachine. The repair method proposed in the present invention enables, by the specific form of the leading edge cutback, the flow in the blade rim area to be steadied and smoothed. This enables the vibration excitation caused by this flow and the resultant decrease in life to be avoided in critical cases, in particular on rotors.

The vibratory wear phenomena encountered, in particular, in the root area of fan blades, which are caused by flow instabilities in the airfoil tip areas of the blades, are reduced by the application of the repair method according to the present invention. This results in an increase of the blade and disk life.

The present invention also provides for an increase in the operating performance of turbomachinery. In accordance with the present invention, an increase in stage efficiency of approximately 0.5% is possible. If the present invention is applied to the fan of an aircraft engine with 25,000 pound thrust, for example, a reduction in specific fuel consumption of up to 0.5 percent will be obtained. A possible stability gain, i.e. an increase of the surge limit of the turbomachine, is to be stated with approximately 5%.

BRIEF DESCRIPTION OF THE DRAWINGS

The present invention is more fully described in light of the accompanying drawings showing preferred embodiments. In the drawings.

DETAILED DESCRIPTION OF THE INVENTION

Figure 1:
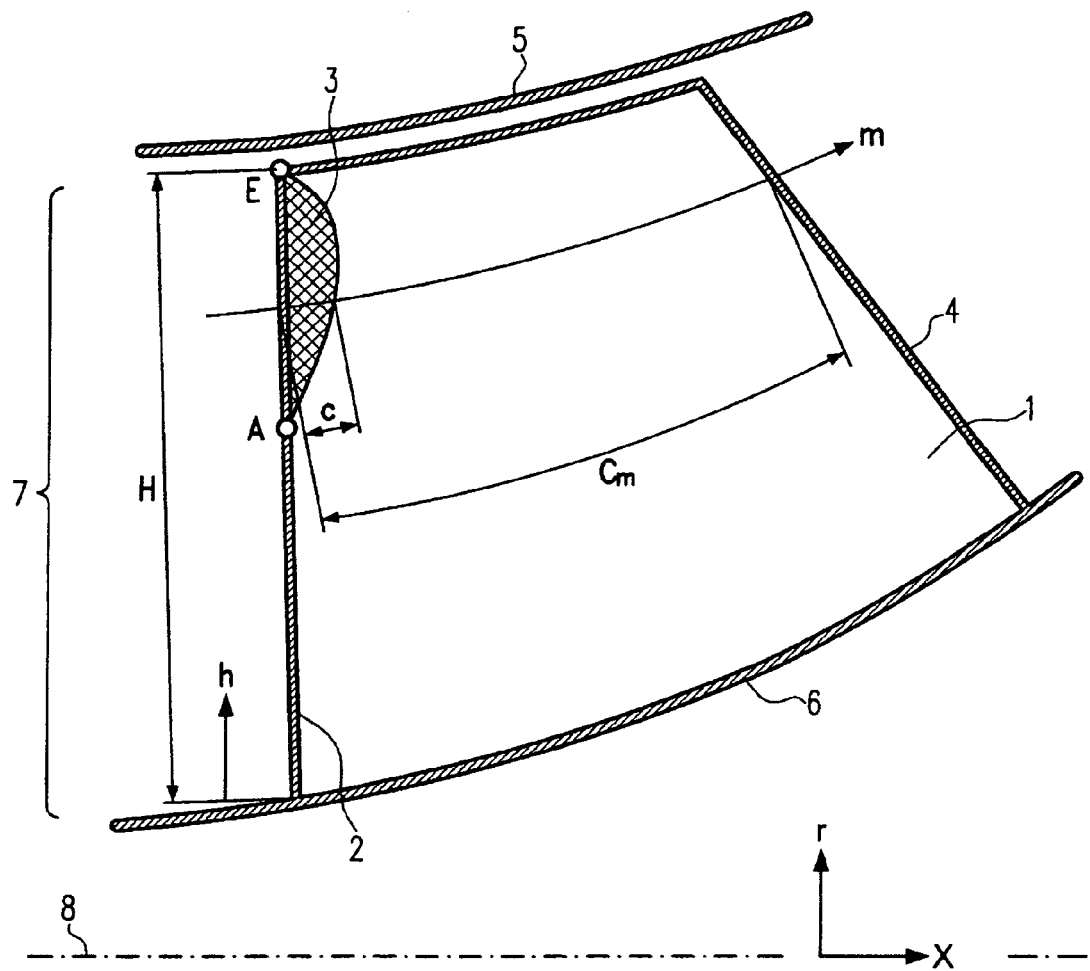
FIG. 1 is a first embodiment of a blade profile cropping by cutback in accordance with the present invention.

FIG. 1 firstly shows a machine axis 8 around which a schematically shown hub 6 rotates. Between the hub 6 and a casing 5 is an annulus 7 which is flown by the working medium.

FIG. 1 shows an embodiment of the present invention on a rotor blade 1 with a leading edge 2 and a trailing edge 4. The cutback to be made in accordance with the present invention is indicated by reference numeral 3. The blade shown in FIG. 1 may also be a stator blade.

Figure 2:
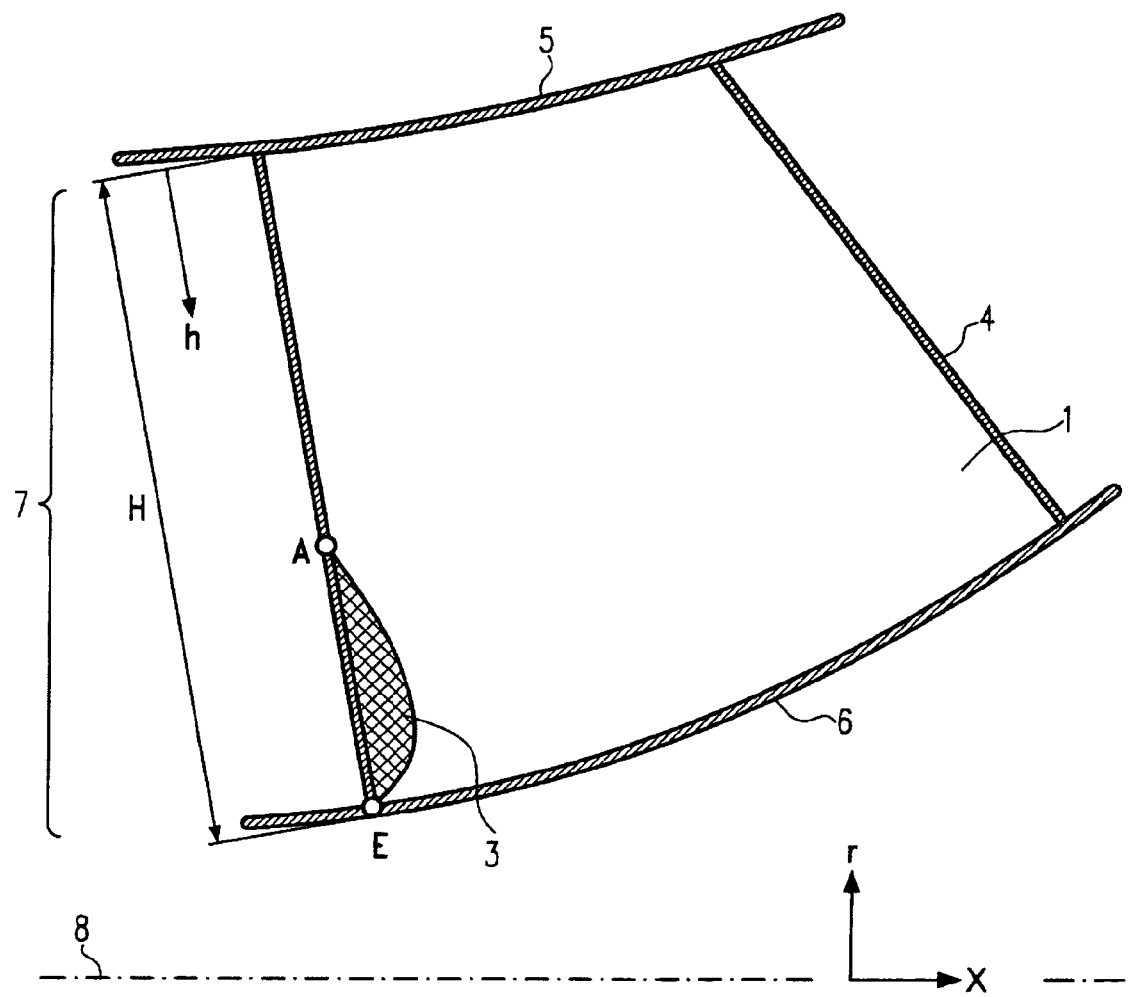
FIG. 2 is a further embodiment of a blade profile cropping in accordance with the present invention.

FIG. 2 shows a further embodiment, with the blade 1 being again a rotor blade or a stator blade. Same items are indicated with the same reference numerals as in FIG. 1.

As becomes apparent from FIGS. 1 and 2, the reduction of the chord length of blade 1 is made solely from the leading edge 2. The maximum amount of cutback 3 is here provided in the area of the blade ends. In accordance with the present invention, one cutback can be made near the hub 6 and one near the casing 5 on a blade 1.

In accordance with the present invention, each cutback 3 is such that the chord length of the blade 1 throughout or in parts of the blade height H is reduced between point A (starting point) and point E (end point) on the leading edge.

In accordance with the present invention, the position of the points A and E is defined by the blade height coordinate h which defines a relative blade height. The blade height coordinate h starts at the end of the blade 1 which is closer to the starting point A. For a relative blade height of h/H, the starting point A lies in the range of:

$$0 \leq (h/H)_{point\ A} < 0.85.$$

For a relative blade height of h/H, the end point E lies in the range of:

$$0.95 < (h/H)_{point\ E} \leq 1.0.$$

In FIG. 1, the local cutback length in meridional flow direction is marked c, while the meridional chord length is indicated with $C_m$. The meridional flow line is marked m. For reasons of clarity, an explanation of these relationships has been dispensed with in FIG. 2, but they also apply to the embodiment of FIG. 2.

Figure 4:
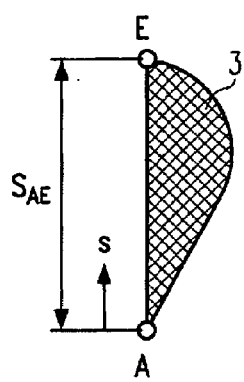
FIG. 4 is an explanation of the dimensions selected.

FIG. 4 shows the definition of the local cutback position s in radial direction as well as the total radial cutback length $S_{AE}$.

Figure 3:
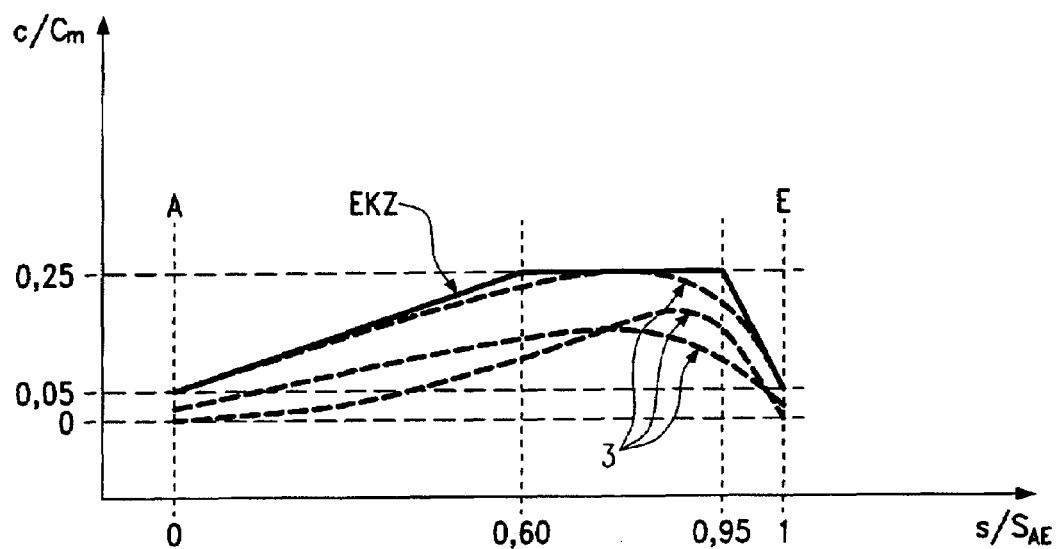
FIG. 3 is a graph which illustrates the blade profile croppings enabled by the present invention.

FIG. 3 explains the traces of possible leading edge cutbacks 3. The figure shows the envelope of the cutbacks 3 enabled by the present invention. The representation employs the relative cutback position $s/S_{AE}$ and the relative cutback length $c/C_m$. In accordance with the present invention, the cutback always extends below an enveloping curve trace EKZ. At the starting point A, the local cutback length c is at a maximum of 5% of the meridional chord length $C_m$ there. The local cutback length c preferably only gradually increases from the starting point A and reaches its maximum in the range of:

$$0.6 < s/S_{AE} < 0.95.$$

In this range, the relative cutback length may amount to $c/C_m \leq 0.25$. Beyond the maximum and up to the end point E, the relative cutback length decreases to $c/C_m \leq 0.05$.

The above definition provides for a great variety of cutback geometries, with FIG. 3 showing, by way of example, three curves of cutbacks 3.

Figure 5:
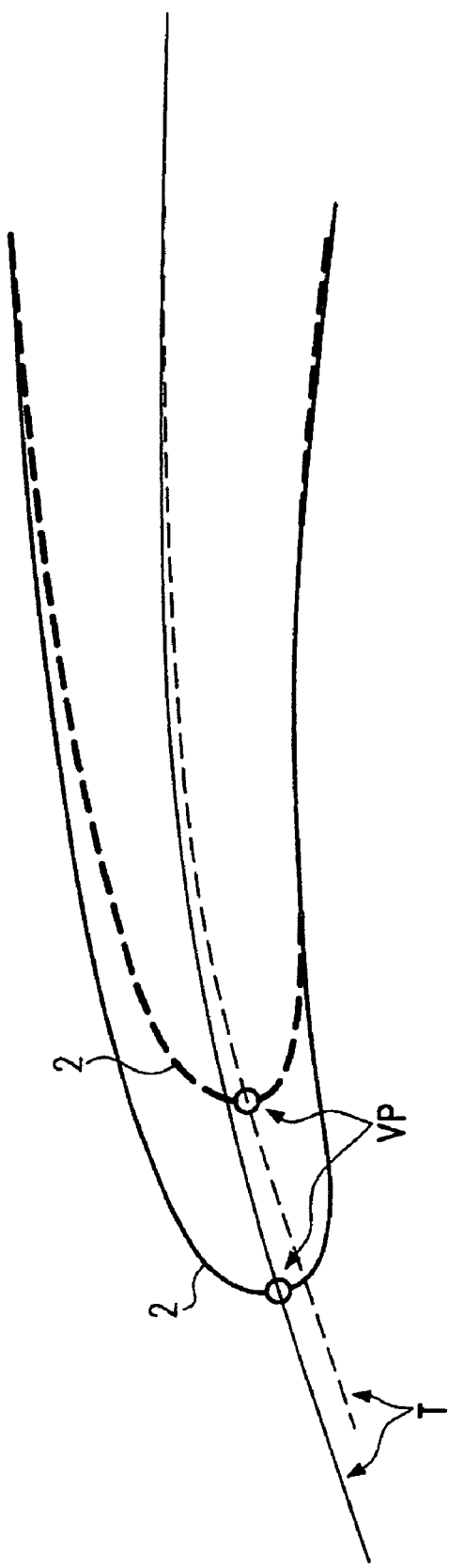
FIG. 5 is a schematic representation, in sectional view, of the shape of the leading edge produced by a cutback in accordance with present invention along the meridional flow line of a blade.

FIG. 5 shows a meridional flow line section of a blade 1 in simplified representation. The unbroken line shows the original profile of the blade 1, while the broken line represents the cropped profile. According to the present invention, it is particularly favorable if the leading edge 2 is modified by the intended cropping such that the resultant shape of the leading edge maintains the inclination of the tangent T to the profile chord at the leading edge exit point VP.

LIST OF REFERENCE NUMERALS

1 Blade
2 Leading edge
3 Cutback
4 Trailing edge
5 Casing
6 Hub
7 Annulus
8 Machine axis
h Blade height coordinate
H Blade height
s Local cutback length in radial direction
c Local cutback length in meridional flow direction
$C_m$ meridional chord length
$S_{AE}$ radial cutback length
m Meridional flow line
T Profile chord tangent at leading edge
A Starting point
E End point
VP Leading edge exit point
EKZ Enveloping curve trace

What is claimed is:

1. A repair method for a blade of a turbomachine, in which at least a partial area of a leading edge of the blade is removed, comprising:
    making a cutback on the blade between two points (A) and (E) whose positions on an original profile of a leading edge of the blade follow the following relationship:
    point (A) is a starting point and lies within a range of a relative blade height (h/H) of $$0 \leq (h/H)_{point\ A} < 0.85,$$

and point (E) is an end point and lies within a range of the relative blade height (h/H) of $$0.95 < (h/H)_{point\ E} \leq 1.0,$$

wherein,
        (h) is a blade height coordinate which originates at an end of the blade which is closer to the starting point (A), and in which (H) is the blade height,
        a trace of the cutback is defined by a relationship of relative cutback position ($s/S_{AE}$) and relative cutback length ($c/C_m$), with
            (c) being a local cutback length in meridional flow direction,
            ($C_m$) being a meridional chord length,
            (s) being a local cutback length in radial direction, and
            ($S_{AE}$) being a radial cutback length,
        and,
        the local cutback length (c) gradually increases from point (A) to its maximum within the range of $0.60 < (s/S_{AE}) < 0.95$, with the relative cutback length ($c/C_m$) amounting to ($c/C_m$) $\leq 0.25$, and with the relative cutback length ($c/C_m$) then decreasing to ($c/C_m$) $\leq 0.05$.

2. A method in accordance with claim 1, wherein the leading edge is given a shape in which an inclination of a tangent to a profile chord of the blade at a leading edge exit point on a profile of the cutback is equal to that on the original profile.

3. A blade of a turbomachine, the blade having a leading edge, comprising:

a cutback positioned on the leading edge between two points (A) and (E) whose positions on an original profile of the leading edge follow the following relationship:

point (A) is a starting point and lies within a range of a relative blade height (h/H) of $0 \leq (h/H)_{point\ A} < 0.85$, and point (E) is an end point and lies within a range of the relative blade height (h/H) of $0.95 < (h/H)_{point\ E} \leq 1.0$, wherein, (h) is a blade height coordinate which originates at an end of the blade which is closer to the starting point (A), and in which (H) is the blade height, a trace of the cutback is defined by a relationship of relative cutback position ($s/S_{AE}$) and relative cutback length ($c/C_m$), with (c) being a local cutback length in meridional flow direction, ($C_m$) being a meridional chord length, (s) being a local cutback length in radial direction, and ($S_{AE}$) being a radial cutback length, and, the local cutback length (c) gradually increases from point (A) to its maximum within the range of $0.60 < (s/S_{AE}) < 0.95$, with the relative cutback length ($c/C_m$) there amounting to $(c/C_m) \leq 0.25$, and with the relative cutback length ($c/C_m$) then decreasing to $(c/C_m) \leq 0.05$.

4. A blade in accordance with claim 3, wherein the leading edge has a shape in which an inclination of a tangent to a profile chord of the blade at a leading edge exit point on a profile of the cutback is equal to that on the original profile.

* * * * *